United States Patent [19]
Tegethoff

[11] Patent Number: 5,937,154
[45] Date of Patent: Aug. 10, 1999

[54] MANUFACTURING FUNCTIONAL TESTING OF COMPUTING DEVICES USING MICROPROGRAM BASED FUNCTIONAL TESTS APPLIED VIA THE DEVICES OWN EMULATION DEBUG PORT

[75] Inventor: Mauro V. Tegethoff, Fort Collins, Colo.

[73] Assignee: Hewlett-Packard Company, Palo Alto, Calif.

[21] Appl. No.: 08/811,852

[22] Filed: Mar. 5, 1997

[51] Int. Cl.⁶ .................................................. G06F 11/26
[52] U.S. Cl. ........................................ 395/183.06; 395/568
[58] Field of Search ...................... 395/183.04, 183.05, 395/183.06, 183.09, 183.11, 500, 704, 568; 371/27.1

[56] References Cited

U.S. PATENT DOCUMENTS

| | | | |
|---|---|---|---|
| 4,873,705 | 10/1989 | Johnson | 371/21.2 |
| 4,985,893 | 1/1991 | Gierke | 371/16.2 |
| 5,271,019 | 12/1993 | Edwards et al. | 371/22.3 |
| 5,329,471 | 7/1994 | Swoboda et al. | 364/578 |
| 5,371,883 | 12/1994 | Gross et al. | 395/575 |
| 5,519,715 | 5/1996 | Hao et al. | 371/22.3 |
| 5,537,536 | 7/1996 | Groves | 395/183.04 |
| 5,539,652 | 7/1996 | Tegethoff | 364/490 |
| 5,541,862 | 7/1996 | Bright et al. | 395/183.04 |
| 5,544,311 | 8/1996 | Harenberg et al. | 395/183.16 |
| 5,548,713 | 8/1996 | Petry et al. | 395/183.01 |
| 5,561,761 | 10/1996 | Hicok et al. | 395/183.06 |
| 5,581,598 | 12/1996 | Hachiga | 379/62 |
| 5,581,695 | 12/1996 | Knoke et al. | 395/183.04 |
| 5,771,240 | 6/1998 | Tobin et al. | 371/22.1 |

OTHER PUBLICATIONS

Electronic News vol. 41, No. 2066, May 22, 1995, A Berger et al. "Distributed Emulation: A Design Team Strategy For High Performance Tools and MPUs", pp. 30–31 and also IAC Accession No. 17027660.

*Primary Examiner*—Robert W. Beausoliel, Jr.
*Assistant Examiner*—Scott Baderman

[57] ABSTRACT

A manufacturing test system and method is presented for testing a computing system under test, which includes a computing device comprising internal emulation debug hardware and an emulation debug port through which the debug hardware is controlled. Manufacturing-level microprogram based functional tests are executed under the control of the internal emulation debug hardware of the computing device. A computing system probe applies the microprogram based functional test to the internal emulation debug hardware of the computing device via the emulation debug port. The manufacturing-level microprogram based functional test may be executed during at any level of computing device integration including the wafer, package, board, multi-chip module and system levels.

26 Claims, 8 Drawing Sheets

MANUFACTURING FUNCTIONAL TESTING OF COMPUTING DEVICES USING MICROPROGRAM BASED FUNCTIONAL TESTS APPLIED VIA THE DEVICES OWN EMULATION DEBUG PORT

FIELD OF THE INVENTION

The present invention relates generally to the field of computer aided electronic circuit testing methodology, and more particularly to a system and method for providing manufacturing functional testing of computing devices using microprogram based functional tests applied via an emulation debug port which resides within the device itself.

BACKGROUND OF THE INVENTION

VLSI circuit technology is rapidly changing due to increases in VLSI circuit complexity, coupled with higher performance and smaller sizing requirements. Increasing importance of improving manufacturing testing techniques at all levels of VLSI integration is emerging due to newer technology, pressures for higher production yield requirements, and tighter time-to-market schedules. The focus of this invention lies in the art of testing computing devices during manufacture. As used hereinafter, a computing device may include a microprocessor, microcontroller, or any application specific integrated circuit (ASIC) which instantiates a processor core into it. A computing device may be used in a computing system, which may be used in a computer, automotive, communications, control, or other application.

During the manufacturing stage, electronic circuit testing generally occurs at each level of integration of the circuit via various testing techniques. Accordingly, testing generally occurs at the wafer level, package level, multi-chip module (MCM) level, board level, and system level. The goal of testing at each level is to detect as many defective circuits as possible before advancing to the next level of testing. Passing a defective circuit to the next level of integration increases product cost. Effective testing provides high fault coverage. Fault coverage may be defined as the ratio between the number of faults a test detects and the total number of faults in the circuit. A test having low fault coverage implies lower yield at the next level of integration, assuming that the test efficiency on the next test step is higher.

The testing techniques currently used in the industry are different at each level of testing. This is due in part to the difference in what is being tested and also what causes a fault at each testing level. At the wafer and package levels, a single component, which may be a microprocessor, microcontroller or ASIC, is being tested. A fault at the wafer or package level may, for example, be caused by a fabrication error such as particle causing shorts. In contrast, at the board and system levels, a system incorporating the component is being tested. A fault at these higher levels of testing may be due, for example, to a functional defect on a component or a solder defect.

At the wafer level, the testing goal is to separate good die from bad, before sawing and component packaging. A test with high fault coverage will ideally remove all fabrication errors. Wafer level testing techniques include parametric testing including current monitoring (IDDQ) testing, stuck-at testing, structural built-in self testing (BIST), internal scanpath testing, and at-speed parallel vector testing. Parametric testing tests if the input receivers and output drivers meet minimum electrical requirements such as threshold and bias voltage and leakage current specifications. The IDDQ testing technique places the CMOS logic of the circuit in a quiescent state and then measures the power supply current. If the current measured exceeds a preset threshold, the test has a detected a defect, and the die is rejected. Parametric testing is effective at detecting fabrication errors; however, it requires significant testing time to make the measurements. Stuck-at testing determines if internal inputs and outputs of logic gates are permanently stuck at a high or low logic level. Fabrication defects are modeled as stuck-at faults. Stuck logic levels adversely affect the logic function of the circuit. The effectiveness of the stuck-at testing technique is measured by the stuck-at fault coverage of the test, which may be defined as the ratio of the number of stuck-at faults tested to the number of actual stuck-at faults possible in the circuit. A high stuck-at fault coverage is desirable. The structural built-in selftest (BIST) technique at the wafer level uses automated hardware based tests contained inside the part which allow the circuit to test itself. The BIST may occur online during normal operation of the chip during an idle state, or offline when the circuit is placed in a special test mode. During wafer level testing, online BIST is employed and generally includes a hardware pseudo-random vector generator and signature analysis hardware. Although the BIST technique is an effective method of detecting stuck-at and delay type faults, it requires costly testing time and die space. Internal scanpath testing is a technique used to map a sequential circuit test generation problem into a combinational circuit test generation problem. Circuits must be pre-designed to include scanpath test hardware, which may include isolated or integrated scan or shadow registers. Automatic test pattern generation is used for achieving very high stuck-at test coverage for sequential circuits. Scanpath techniques also include at-speed functional tests which detect delay faults located in the latch-to-latch path being tested. Delay faults affect the timing of the circuit. A delay fault may be defined as a defect that causes the response of a gate or path in the circuit to be too slow, and therefore does not meet the required speed specifications. The component will perform incorrectly as the delay fault is propagated throughout the circuit. In the at-speed parallel vector functional testing technique, test vectors used in the simulation of the electronic circuit in the design phase are applied to the inputs of the electronic circuit device on a tester at the operating speed of the device. The outputs of the devices are then observed to determine if the operation of the device is correct. Although at-speed functional testing is effective in the detection of delay faults, this technique requires test equipment which operates at speeds slightly higher than the component target speed. IC testers capable of performing at-speed functional tests are very expensive and physical connection to the wafer becomes difficult if not impossible at frequencies required by current technology devices due to bandwidth limitations in the wafer probing connection to the silicon wafer.

Testing at the packaged integrated circuit (IC) level usually employs the same testing techniques as those performed at the wafer level. However, any performance limitations imposed by wafer prober bandwidth are removed, since at the packaged IC level one can create interconnects from the tester to the pins of the package that allow the rate of test vectors to be the same or higher than the component operating frequency. As a result, functional testing using at-speed parallel vectors becomes more viable at this level.

Testing at the board level is typically performed in two distinct steps, including assembly process testing and board functional testing. The assembly process test detects defects that occur during the manufacturing of the board such as solder shorts, opens, and reversed components. The board functional test verifies that the board performs according to its specifications. In computing system boards, the board functional test generally includes a microprogram based functional test and a software diagnostics test. A microprogram as used hereinafter is a sequence of elementary machine level instructions which correspond to computing device operations and whose execution is initiated by the introduction of a computing device instruction into an instruction register of the computing device. A microprogram based functional test as used hereinafter is a microprogram that is designed to test the functional operation of a computing device. The microprogram based functional testing technique allows a computing device to be tested by executing machine level instructions at the operating frequency of the computing device in an autonomous fashion. An example of a microprogram based functional test is the built-in selftest (BIST) that computer systems execute from a read-only memory (ROM) at power-up. The software diagnostic test portion of the board functional test require the system to be booted up and are run from the operating system level. Microprogram based functional tests provide an effective method for detecting the majority of functional defects at the board level due to their ability to be run at the operating speed of the circuit and their ability to perform operations that the computing device is designed to perform. However, isolation of the cause of the defect is difficult and requires the help of a skilled technician. Also, in a ROM-based BIST, the microprogram based functional test is developed and frozen by R&D in the design stage before the product is ramped to manufacturing. Since the coverage and isolation of a ROM-based BIST is static, it is very difficult to alter or add a new test, or control the testing such as looping on a failure. Without more flexible control of the microprogram based functional test, its fault coverage may be lower because it is usually not perfectly matched to the fault spectrum of the product.

The multi-chip module (MCM) level presents two testing alternatives. In one alternative, the MCM may be treated as a board. In this case, the board level assembly and functional testing technique may be applied to the MCM. Board level testing is difficult since critical components needed for BIST-type microprogram based functional testing such as an integrated boot ROM are missing. In another alternative, the MCM may be treated as an integrated circuit (IC). In this case the package level testing technique may be applied to the MCM. Package level testing at the MCM level is difficult due to its increased complexity.

System testing is performed once the final system is assembled. The system may contain multiple boards. System test is similar to board level functional test but relies more on operating system diagnostics in addition to the ROM based microprogram based functional test.

Each of the testing techniques discussed above for each testing level carry with them intendant problems. Circuit testing at the wafer level requires expensive testing time, die space, and engineering time in designing high fault coverage tests. In addition, if at-speed functional testing is performed, wafer level testing also incurs the high cost of at-speed functional test equipment and difficulty in applying the test due to the limited probing bandwidth of the testing equipment (approximately 150–200 MHz with current wafer probers). Packaged level circuit testing also suffers from the difficulty and expense of generating high fault coverage tests and the high costs of at-speed functional test equipment. Board level testing carries with it the intendant difficulties of diagnosing faults detected by a microprogram based BIST and its accompanying high cost of technician time in debug, along with difficulties in altering or improving BIST fault coverage. Testing at the MCM level suffers from increased circuit complexity and the difficulty in pinpointing a defective component which may have escaped detection at a lower testing level. A need exists to solve the above problems.

A related area in computing system development technology is the need for computer device emulation by the developers of final product computing systems. A recent innovation is the implementation of a debug port for emulation and internal emulation debug hardware within the computing device itself. Emulation as used hereinafter includes the ability to control execution and to read and write registers, memory and I/O of a computing device. Access to the emulation debug hardware is provided through an emulation debug port of the computing device. Most new microprocessors and microcontrollers now include an emulation debug port as a standard feature. The purpose of the emulation debug port is to assist system developers in the emulation debug process used when they are developing the system firmware around the computing device. In the recent past system developers used system emulators and emulation pods to debug and develop system firmware, but with the complexity and difficulty in physical access to modern VLSIs, the industry has moved to implementing the emulation hardware inside the computing device and making them accessible via the debug port. It would be desirable to provide a system and method to take advantage of internal emulation debug hardware of a computing device when testing the computing device or system incorporating the computing device during manufacturing.

SUMMARY OF THE INVENTION

The present invention solves the above problems by providing an improved system and method for testing computing devices and boards, MCMs and systems which incorporate computing devices, during the manufacturing phase. The system and method of the invention allows an effective microprogram based functional test running at operational speed to be applied to a computing device at every level of device integration. The present invention allows a microprogram based functional test which runs at operational speed at each level of testing to be easily altered and improved, even interactively. Fault coverage may therefore be improved at each testing level. The resulting significant increase in fault coverage at the wafer level significantly lowers production costs by catching defective circuits at earlier levels in the testing process, thereby eliminating more costly testing overhead such as technician time in downstream testing steps. The system and method of the invention also simplifies the testing process by allowing the same or similar at-speed functional tests to be applied to the circuit at each level of testing.

The present invention provides a system and method for applying microprogram based functional tests to a computing device which has internal emulation debug hardware accessible through an emulation debug port. In the system and method of the invention, a microprogram based functional test is sent to a computing system probe which communicates with the computing device via its emulation debug port. The computing system probe applies the microprogram based functional test to the computing device and controls its execution via emulation debug commands sent via the emulation debug port. Results from the microprogram based functional test may be retrieved from the computing device via the emulation debug port or may be observed via the I/O bus or other I/O devices. This computing system probe emulation technique may be performed at each level of computing system integration. Execution of the microprogram based functional test may be achieved by sending one microprogram based functional test command at a time from the computing system probe to the computing device under test via the emulation debug port and causing it to be executed via an emulation debug execute command. In an alternative method, the microprogram based functional test may be downloaded into a memory internal to the computing system via an emulation debug download command and executed directly from the memory. As used hereinafter, memory includes internal or external cache memory or main RAM memory. The microprogram based functional test may be derived from code developed for a boot ROM by modifying, adding or removing code from the boot ROM code to produce a microprogram based functional test for use in manufacturing testing. Generally, the computing system probe is controlled by a test host computer via a serial port, local area network (LAN), or any other form of communications means. The test host may include software for analyzing the microprogram based functional test results or automatically generating microprogram based functional tests. Based on microprogram based functional test results, a given microprogram based functional test may be modified and improved to produce a higher fault coverage test to be used in batch mode as the manufacturing test.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawings, of which:

DETAILED DESCRIPTION OF THE PRESENT INVENTION

Figure 1:
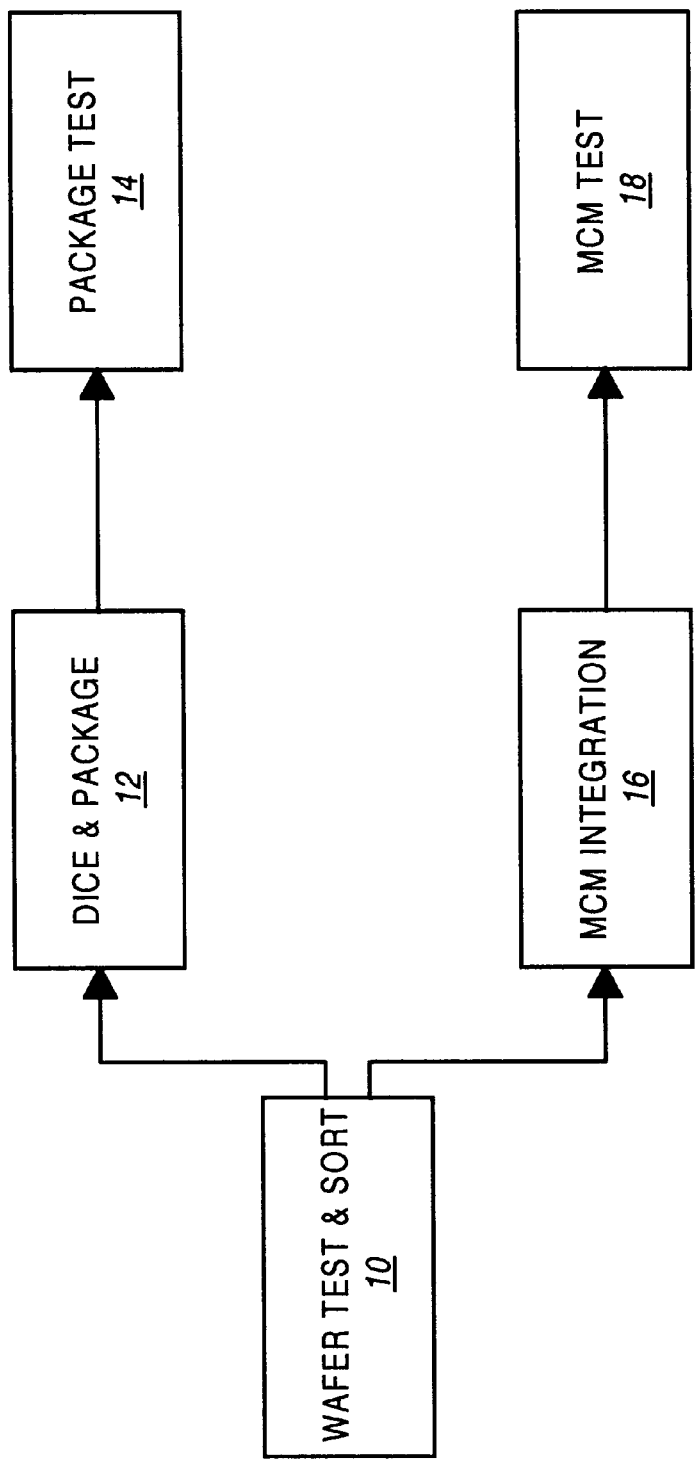
FIG. 1 is a block diagram of an initial manufacturing test path of a computing device.

FIG. 1 is a block diagram illustrating the initial manufacturing test path of a computing device. During the manufacturing process numerous computing devices are fabricated on a single wafer. Initial testing begins at the wafer level. During a wafer test and sort phase 10, wafers are placed on a wafer prober attached to a semiconductor tester which performs various parametric and functional tests on each individual computing device on the wafer. The individual computing devices on the wafer are sorted according to the results of the wafer level tests, and the known defective computing devices are discarded. Traditionally, the individual computing devices which pass the wafer test are then packaged during a packaging phase 12. After packaging, each individual computing device is further tested in a package test phase 14. Typically, the package-level test is similar to the wafer-level test. The package level test may include more extensive functional testing than that performed at the wafer level, however, due to the removal of bandwidth limitations of the wafer test probes. Various testing techniques which may be performed at either the wafer or package level or both include parametric testing, scan-path testing and forms of hardware based built-in selftests and vector based functional tests. These techniques are known in the art. A detailed discussion of these testing techniques may be found in M. Abramovici, M. A. Breuer, and A. D. Friedman, "Digital Systems Testing and Testable Design", New York: W. H. Freeman and Company, Computer Science Press, 1990, ISBN 0-7167-8179-4, and V. D. Agrawal and S. C. Seth, "Test Generation for VLSI Chips", Washington D.C.: IEEE Computer Society Press, 1988, ISBN 0-8186-8786-X.

Recently, the industry has been moving towards the fabrication of multichip modules (MCMs). Multichip modules integrate a plurality of unpackaged computing devices onto a single fixed substrate before being packaged. If a computing device is to become part of an MCM, those individual computing devices which pass the wafer tests may instead pass from the wafer test and sort phase 10 to an MCM integration phase 16, where the computing device is diced and integrated into an MCM. The integrated computing device is then tested at the MCM level during an MCM test phase 18. Testing at the MCM level can become quite cumbersome both in pinpointing a defective component of the MCM and in making repairs to such defective components. The importance of filtering out defective computing devices at the wafer level becomes increasingly important when dealing with MCMs. Production costs are increased when an MCM must be discarded or repaired due to a defective computing device since hardware additional to the computing device may be discarded, and testing, debugging and repair consume valuable technician time. The problem is compounded for each additional computing device integrated into the MCM because probability of producing a functionally correct MCM significantly decreases. A more detailed discussion of MCM testing may be found in D. A. Doane and P. D. Franzon, "Multichip Module Technologies and Alternatives—The Basics", New York: Van Nostrand Reinhold, 1993, ISBN 0-442-01236-5.

Figure 2:
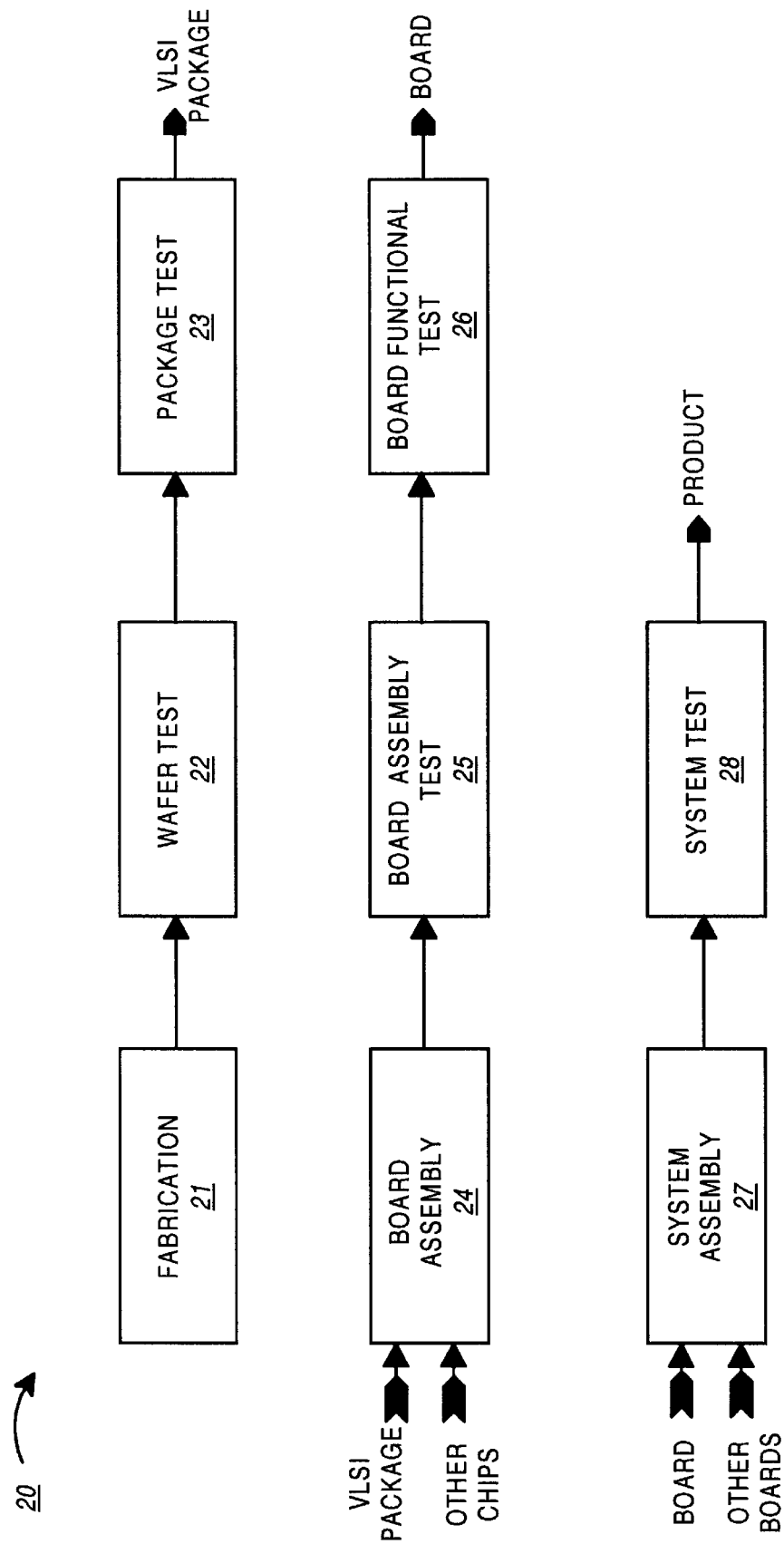
FIG. 2 is a block diagram of a standard manufacturing test path of a computing device from the wafer level through the system level.

FIG. 2 is a block diagram illustrating a standard manufacturing test path 20 of a computing system from the moment of fabrication to the time it is ready to ship. The manufacturing test path 20 of FIG. 2 assumes that the computing device is not integrated into an MCM but goes directly to packaging. As shown in FIG. 2, the computing device is fabricated during a fabrication phase 21. After fabrication, the computing device passes through a wafer test phase 22. Those individual computing devices which pass the wafer tests are diced and packaged, and then passed on to a package test phase 23. The packaged computing devices which pass the package level tests are then integrated into a circuit board in a board assembly phase 24. After board integration, the board passes through a board level assembly test phase 25 which detects assembly faults such as soldering shorts or component reversal. If the board passes the board level assembly tests, it is passed on to a board level functional test phase 26. The board level functional tests detect functional defects in the board, which may or may not be caused by the original computing device under test. If the board passes the board level functional tests, the manufacturing test may be complete or it may be passed on to higher levels of testing if it will become part of a larger system. If the board does become part of a larger system, the board is assembled in the system during a system assembly phase 27 and undergoes further testing during a system level test phase 28. If the system which includes the original computing device under test passes the system level tests, the manufacturing test is complete.

It is apparent from the above discussion that detecting defective computing devices at the earliest possible testing level is critical. Detecting a defective computing device becomes increasingly costly the further along in the testing path that the defect is detected due to the additional testing time and any additional hardware into which the computing device is integrated which may have to be discarded.

As discussed in the background section, microprogram based functional test techniques can prove highly effective in detecting functional defects in a computing device. However, as also discussed previously, ROM-based BIST-type microprogram based functional tests are limited in that they are static and developed during the design phase. The present invention provides that ability for microprogram based functional tests to be flexible and to be used for manufacturing tests in either a batch mode or an interactive mode. As also discussed in the background section, many modern computing devices provide internal emulation debug hardware with an accompanying emulation debug port for accessing it. The internal emulation debug hardware may be used to assist system developers in developing system firmware around the computing device.

Figure 3:
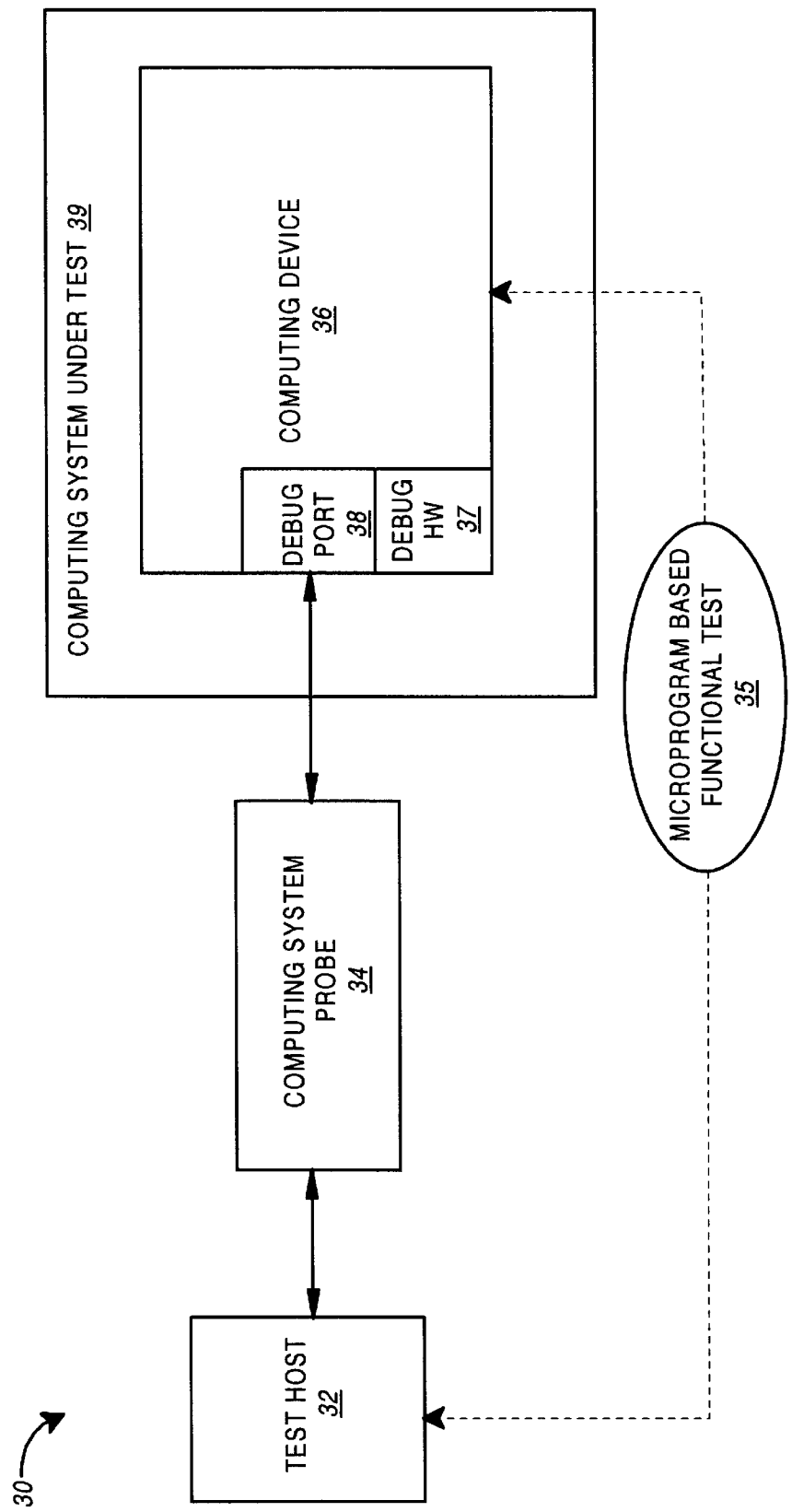
FIG. 3 is a block diagram of a computing device functional testing system in accordance with the present invention.

FIG. 3 is a block diagram of a computing device functional testing system 30 in accordance with the present invention. The computing device functional testing system 30 may be used, as part of the manufacturing test, to test a computing system 39 using effective microprogram based functional tests running at the system's operational speed which are applied to a computing device 36 within the computing system 39 at every level of circuit integration. At the wafer level, the computing system 39 reduces to a computing device. At higher levels of testing, the computing system 39 may include multiple circuit components and computing devices. The computing device functional testing system 30 of the present invention requires that the computing system under test 39 include a computing device 36 that comprises internal emulation debug hardware 37 and which may be accessed via an emulation debug port 38. The microprogram based functional tests used in the present invention are applied to the computing device 36 via the computing device's own emulation debug port 38 using a computing system probe emulation technique. The emulation debug port 38 of the computing device provides access to emulation debug hardware 37 internal to the computing device 36. The computing device functional testing system 30 and the methodology it teaches may be implemented at each of the various levels of functional testing, including wafer level testing, package level testing, board level testing, multi-chip module level testing and system level testing.

As shown in FIG. 3, the computing device functional testing system 30 includes a test host computer 32 which interfaces to a computing system probe 34. A computing system probe as used hereinafter provides the ability to have run control of the computing device, and modify the contents of its memory, registers and I/O through an emulation debug port of the computing device. In the preferred embodiment communication is provided by use of a local area network (LAN) or a serial port. However, the method of communication is not limited to a LAN or serial port and any means of communication may be used to link the test host computer 32 and computing system probe 34. As previously mentioned, the computing device 36 is provided with an emulation debug port 38 for external access to the computing device's internal emulation debug hardware 37. The computing system probe 34 may be configured to control the emulation debug hardware 37 through the emulation debug port 38 of the computing device under test 36 via a hardware interface. The computing system probe 34 of the present invention provides the ability to have run control of the computing device, and modify the contents of memory, registers and I/O through the emulation debug port of the computing device. In the preferred embodiment, the computing system probe 34 also preferably provides debug emulation features including high-speed code downloading, target system programming of flash memory, and the capability of displaying as well as modifying the target computing device's memory and registers. For a computing device 36 which incorporates a Motorola 683xx family microcontroller, a Hewlett-Packard HP E3490A Processor Probe may be used to implement the computing system probe 34. The HP E3490A may be used via LAN to run the computing device 36 at full speed, download code, and set software and externally generated hardware breakpoints. For a computing device 36 which incorporates an Intel Pentium® processor, a Hewlett-Packard HP E3491A Pentium® Processor Probe may be used to implement the computing system probe 34. It is important to note that previously the computing system probe emulation technique was used as a low cost way to debug embedded software for processors which have on-chip debug features. It has not previously been utilized in a manufacturing test device. The computing system probe 34 connects to the debug port 38 of the computing device 36 and communicates with the computing device 36 to control internal emulation. The use of the computing system probe 34 allows the operation of system memory accesses and I/O device communication to be tested without using an external testing probe by controlling the debug features inside the computing device 36.

As described in the background section, microprogram based functional test is a testing technique where the computing device is tested by executing machine level instructions at the operating frequency of the part in an autonomous fashion. The microprogram based functional test will typically exercise the functionality of the computing device, memory and I/O devices. The typical method for this test is to perform it during the power up and boot sequence. However, in the present invention, the microprogram based functional test is executed as a manufacturing test used to detect defective components in the manufacturing process. A microprogram based functional test 35 may be provided either to the computing system under test 39 by loading it into a memory, which may be an internal cache, external cache or external RAM, or it may be provided to the computing system probe 34 interactively via the test host computer 32, depending upon the desired microprogram based functional test to be run and the configuration of the computing system under test 39. For example, a microprogram based functional test could be run interactively from the test host 32 and executed directly from the computing system probe 34 one instruction at a time using a handshake operation between the computing system probe 34 and debug port 38. A more sophisticated computing system under test 39 might include an internal or external cache memory or external RAM. The microprogram based functional test in this case could be downloaded to the memory from the test host 32 via the computing system probe 34 and debug port 38 and then run in batch mode at operational speed from the memory. In the alternative, the computing system probe 34 may be part of a computing system test which may include a memory emulator that probes the I/O pins of the computing device 36. If so, the microprogram based functional test could be downloaded to the memory emulator of the computing system probe 34 and executed at operational speed from there.

Microprogram based functional test generation may be accomplished in one of three ways. A most basic implementation would allow the user to write his own microprogram based functional test and test script files which would be executed on the test host 32. Calls from the test script files via a command to the computing system probe 34 either causes the microprogram based functional test to be executed directly from the computing system probe 34 in an interactive mode via the computing device debug port 38, or causes the microprogram based functional test to be downloaded into memory of the computing device 36 and executed in batch mode from the memory. Results from the microprogram based functional test may be returned to the test host 32 from the computing system probe, or may be observed through any I/O device. In a more advanced implementation, automatically generated test files which test memory and I/O could be generated and executed as above. A third implementation might provide a utility for translating boot ROM microprogram based functional test code into tests residing in files on the test host 32 which can be executed by the computing system probe 34.

In prior art manufacturing test systems, microprogram based BIST test coverage is determined at the time the code is written by R&D, and the test is programmed into and executed from ROM. Since the computing device fault spectrum is not static, however, it would be helpful to be able to alter the selftest coverage and if possible, add and remove tests as needed. With the prior art static ROM selftest approach, this is not possible because R&D development tools and engineering time would have to be used during the manufacturing phase to modify the test. Typically R&D resources are unavailable, engaged in the design of future produces, during volume manufacturing. As discussed above, the capability of the present invention for allowing microprogram based functional tests 35 other than an internal static ROM microprogram based functional test to be run at operating speed on the computing device 36 allows a manufacturing technician to run a variety of microprogram based functional tests, modify them and improve them to increase the fault coverage of the microprogram based functional test at a given testing level. In addition, because the microprogram based functional test 35 may be run via the debug port 38 of the computing device 36 rather than through expensive test probes with significant bandwidth limitations, a functional microprogram based functional test 35 may be run on the computing device at any testing level, including the wafer level. The flexibility in modifying the microprogram based functional tests 35 and in applying them to the computing device 36 at any testing level allows the fault coverage of wafer level testing to significantly increase and therefore to significantly cut production costs on wasted downstream components and testing time.

The computing system probe 34 may run a microprogram based functional test in either a batch or an interactive mode. The advantage of running the computing system probe 34 in interactive mode is that it allows a manufacturing test technician to modify and improve the microprogram based functional test 35. The microprogram based functional test 35 could be improved to achieve very high fault coverage levels, which would potentially eliminate the need for booting the operating system and running diagnostics which require long execution time at the board level. The interactive mode may also be used assist in troubleshooting failures.

Once a high fault coverage microprogram based functional test 35 is developed, the manufacturing test line can take advantage of the batch mode of the computing system probe 34 to run the microprogram based functional test 35 on the production line. Batch tests can be loaded and executed from memory within the computing system under test 39 at speed. An original set of batch tests, in the form of assembled code or assembly source code, could be derived from the R&D boot ROM selftest and augmented or reduced by a manufacturing engineer as the need arises. Test results from the microprogram based functional test 35 may be echoed back from the computing system probe 34 to the test host computer 32 or may be observed through I/O devices or loaded into registers and observed. Diagnostic determinations may be performed on the results. Libraries of batch tests may be developed and leveraged across products.

In one implementation of the invention, a Hewlett-Packard HP9000 series 700 workstation may be used as the test host 32 to serve as a development environment for a computing system probe 34 driver. The computing system under test 39 in this implementation incorporates a computing device 36 implemented with a Motorola 68332 which includes emulation debug hardware and an emulation debug port for access. The HP9000 workstation contains the sources and tools necessary to build a Motorola BDM (Background Debug Mode) CPU32 Software Probe driver. In addition, the HP9000 workstation includes a Hewlett-Packard HP64782 68332 emulator. The emulator probe connects to the computing system probe 34, which is implemented with a Hewlett-Packard HP E3490A. The emulator is used for run control, code load and memory access, and code execution trace.

Loaded onto the HP9000 workstation are the Hewlett-Packard products B3640 and B3641, comprising the AXLS C 68xxx compiler, assembler, and linker. In addition, Hewlett-Packard products B3092, B1473 and B1487 are loaded, which include the Motorola 683xx workstation user interface, Motorola debugger user interface, and Software Performance Analyzer interface. The HP B3092, B1473 and B1487 operate together with the HP64782 68332 emulator to provide various measurement and control capabilities. A Software Performance analyzer card is also included in the emulator frame in order to make use of the Software Performance analyzer.

An example implementation of a simple Unix shell based microprogram based functional test which executes in batch mode on the HP 9000 test host of the present invention is given below. The microprogram based functional test shown below is a walking ones test in the address range of the main memory of a Motorola 68332 target computing device system.

Shell Script

This shell script puts the test in file rt1 in a loop, and then checks the results that were redirected to file tst1.out against the expected result in file tst1.good.

```
while true
do
    # run test file rt1 #
    rt1
    # concatenate results into output file #
    cat tst1.out
    # compare actual results with expected results #
    diff tst1.out tst1.good>/dev/null
    if [$?-eq 1]
    then
    echo "TEST FAILED"
    else
    echo "TEST PASSED"
    fi
    echo "Testing—Address walking ones . . . "
done
```

Test file rt1 causes a test file tst1.cmd to be executed. The results are parsed and redirected to the output file tst1.out. In this example, "lanload" is a command executed from a Unix shell on the test host 32 that executes a batch test on the computing system probe 34 via LAN. The LAN values 15.11.8.210 in the example below are the ip address.

rt1

```
lanload -c 15.11.8.210<tst1.cmd>tst1.1st
cat tst1.1st|out_clean>tst1.out
```

Below is a sample of the tst1.cmd file, which contains the actual computing system probe commands. The commands shown below are written in syntax developed for the Hewlett-Packard HP E3490A product. These commands could also be executed interactively for debug. The "m" command is a memory command as described hereinafter.

tst1.cmd

```
mo -d1
#fill 0
#walk 1 addr
m 3000 . . ffff=5555
#expect data=55 addr=3000
m 3000
m 3000=AA
#expect data=55 addr=3001
m 3001
m 3001=AA
#expect data=55 addr=3003
m 3003
m 3003=AA
#expect data=55 addr=3007
m 3007
m 3007=AA
#expect data=55 addr=300f
m 300f
m 300f=AA
#expect data=55 addr=301f
m 301f
m 301f=AA
```

The memory command "m" used in the example tst1.cmd file is used to display or modify processor memory space as follows:

m <addr>—display memory at address m -d<size><addr>—display memory at address with display size m<addr>. . <addr>—display memory in specified address range m<addr>. . —display 128 byte block starting at address A m<addr>=<value>—modify memory at address to <value> m <addr>. . <addr>=<value>,<value>—fill range with repeating sequence

Below is a sample of the expected response file tst1.good. It contains the memory location and the expected data from a memory read.

tst1.good

```
00003000 55
00003001 55
00003003 55
00003007 55
0000300f 55
0000301f 55
```

Figure 4:
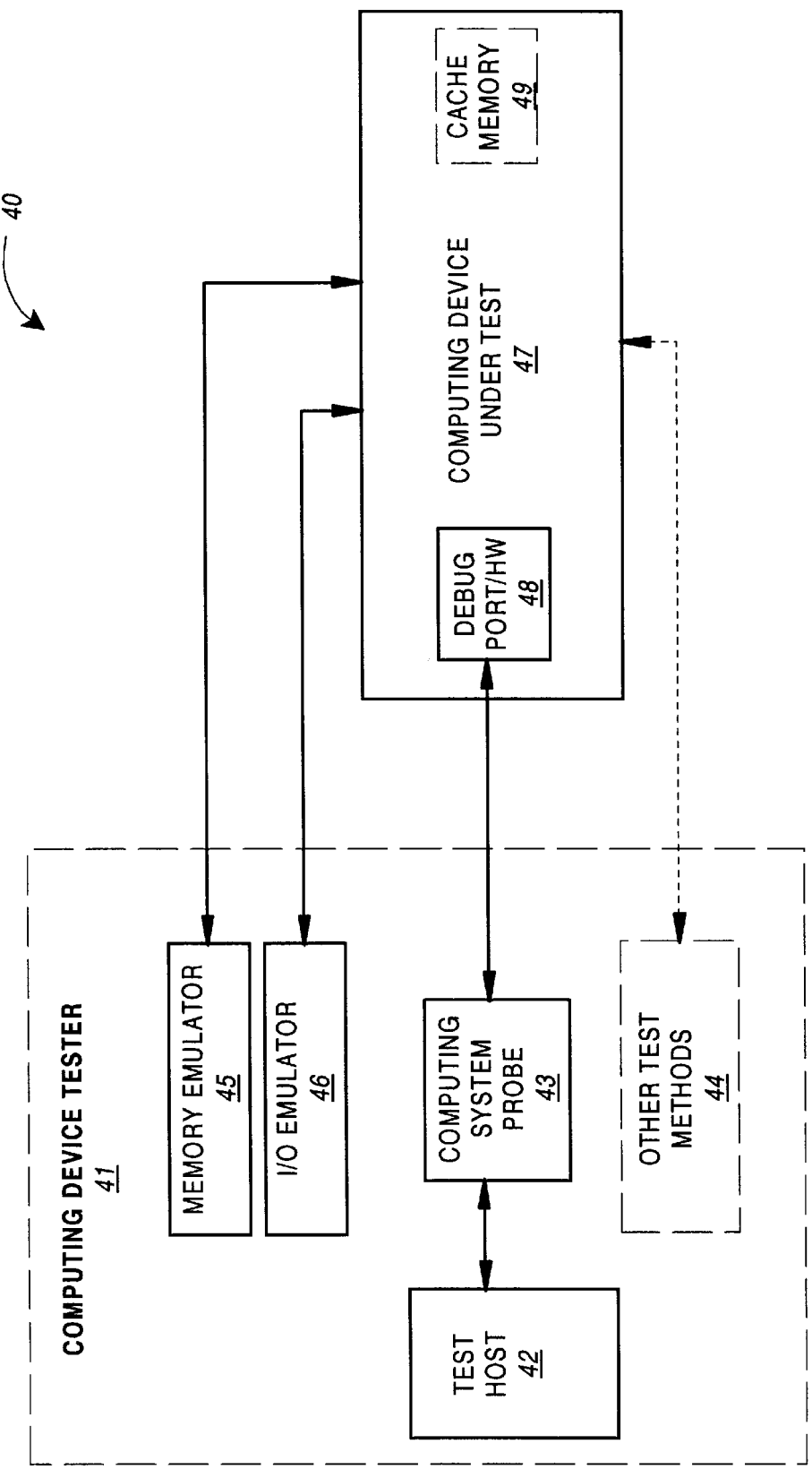
FIG. 4 is a block diagram of a system in accordance with one embodiment of the present invention for executing a microprogram based functional test on a computing device at the wafer or package testing level.

FIG. 4 is a block diagram of a system 40 in accordance with one embodiment of the present invention for executing a microprogram based functional test on a computing device at the wafer or package testing level. The system 40 comprises a computing device tester 41 and a computing device under test 47, which includes an emulation debug port and associated hardware 48. At the wafer or package level, what is tested is the computing device under test 47 itself. Accordingly, the computing device tester 41 generally includes means to emulate memory and I/O devices. As shown in FIG. 4, the computing device tester 41 includes a test host 42 and computing system probe 43 such as those used in the embodiment of FIG. 3, and may also include a memory emulator 45 and an I/O device emulator 46. The I/O device emulator 46 performs bus handshakes with the computing device under test 47 using an appropriate bus protocol. If the computing device under test 47 includes an embedded cache memory 49, a microprogram based functional test may be downloaded from the test host 42 via the computing system probe 43 into the cache 49 and executed directly from the there. In another alternative, if the computing device under test 47 does not include a cache memory 49, the microprogram based functional test may be downloaded to the memory emulator 45 which probes the I/O pins of the computing device under test 47 and the computing system probe 43 can control execution of the test through the emulation debug port 48 of the computing device under test 47 using run control commands. As also shown in FIG. 4, the computing device tester 41 may include other test methods 44 such as scanpath, current monitoring and other tests to complete a test suite.

Figure 5:
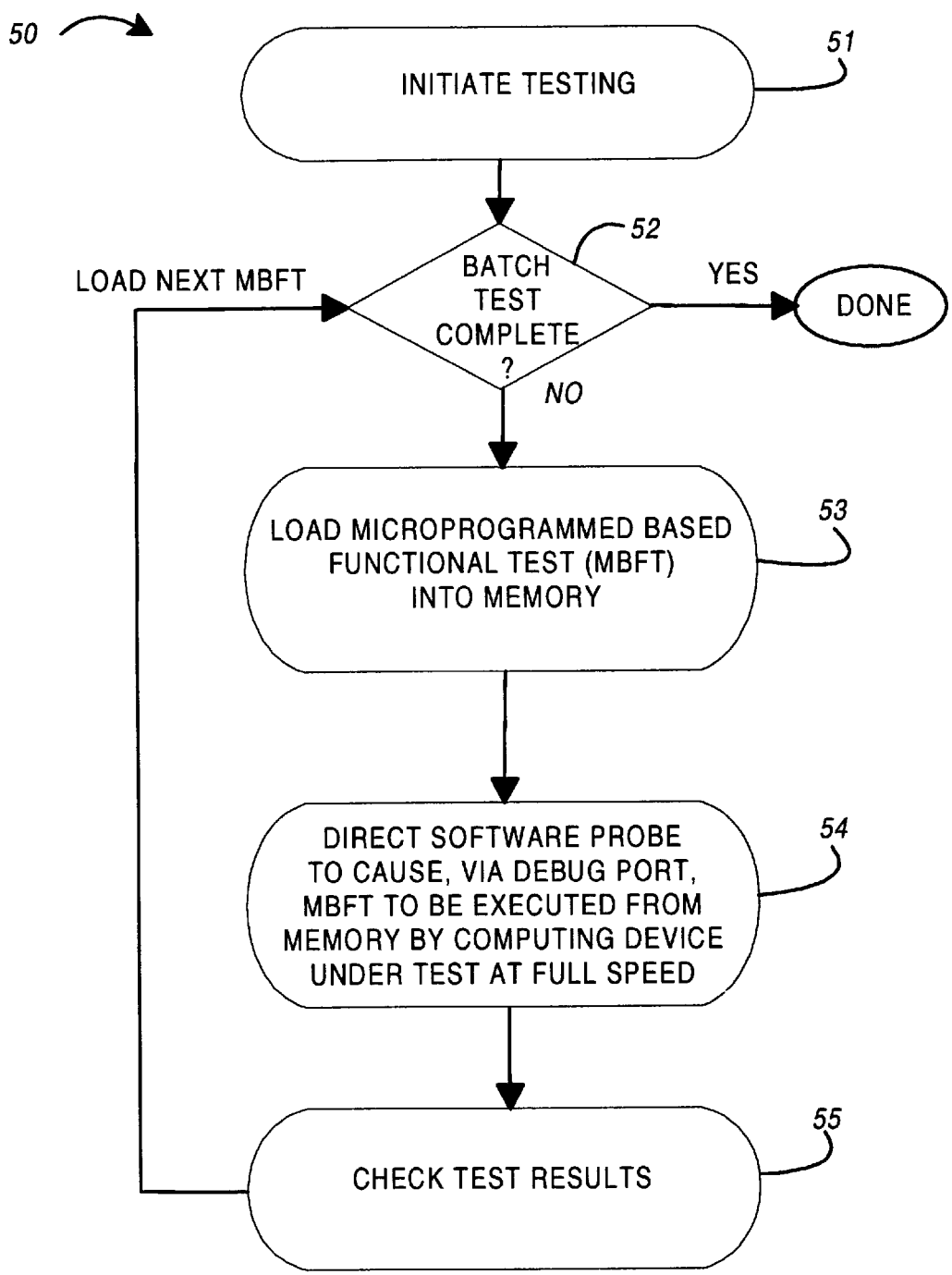
FIG. 5 is a flowchart depicting the method of the present invention executed in batch mode in the context of the wafer level computing device test system of FIG. 4.

In practice, microprogram based functional tests will be executed in manufacturing in batch mode first. Then, if a test fails, an operator may execute tests in interactive mode. FIG. 5 is a flowchart depicting the method of the present invention executed in batch mode in the context of the wafer level computing device test system 40 of FIG. 4. As shown in FIG. 5, the method for testing the computing device under test 47 requires a first step 51 of initiating a batch test. The method 50 includes a second step of determining if the testing is complete. If so, the batch test exits. Otherwise, the method 50 includes a step 53 in which a microprogram based functional test to be executed is loaded into a memory emulator 45 of the computing device tester 41. If the computing device under test 47 includes an embedded memory 49, the microprogram based functional test is loaded into it. Otherwise, the microprogram based functional test is loaded into the memory emulator 45 of the computing device tester 41. The microprogram based functional test may be developed by a user, automatically generated, or derived from a ROM-based microprogram based functional test. In a step 54, the computing system probe 43 causes the microprogram based functional test to be executed at speed by the computing device under test 47. The results of the microprogram based functional test are checked in a step 55. Another microprogram based functional test may then be loaded. Step 52 is then repeated to determine if the batch test is complete. If not, steps 53 through 55 and then 52 are then repeated until the last microprogram based functional test has been executed and the batch test is complete.

Figure 6:
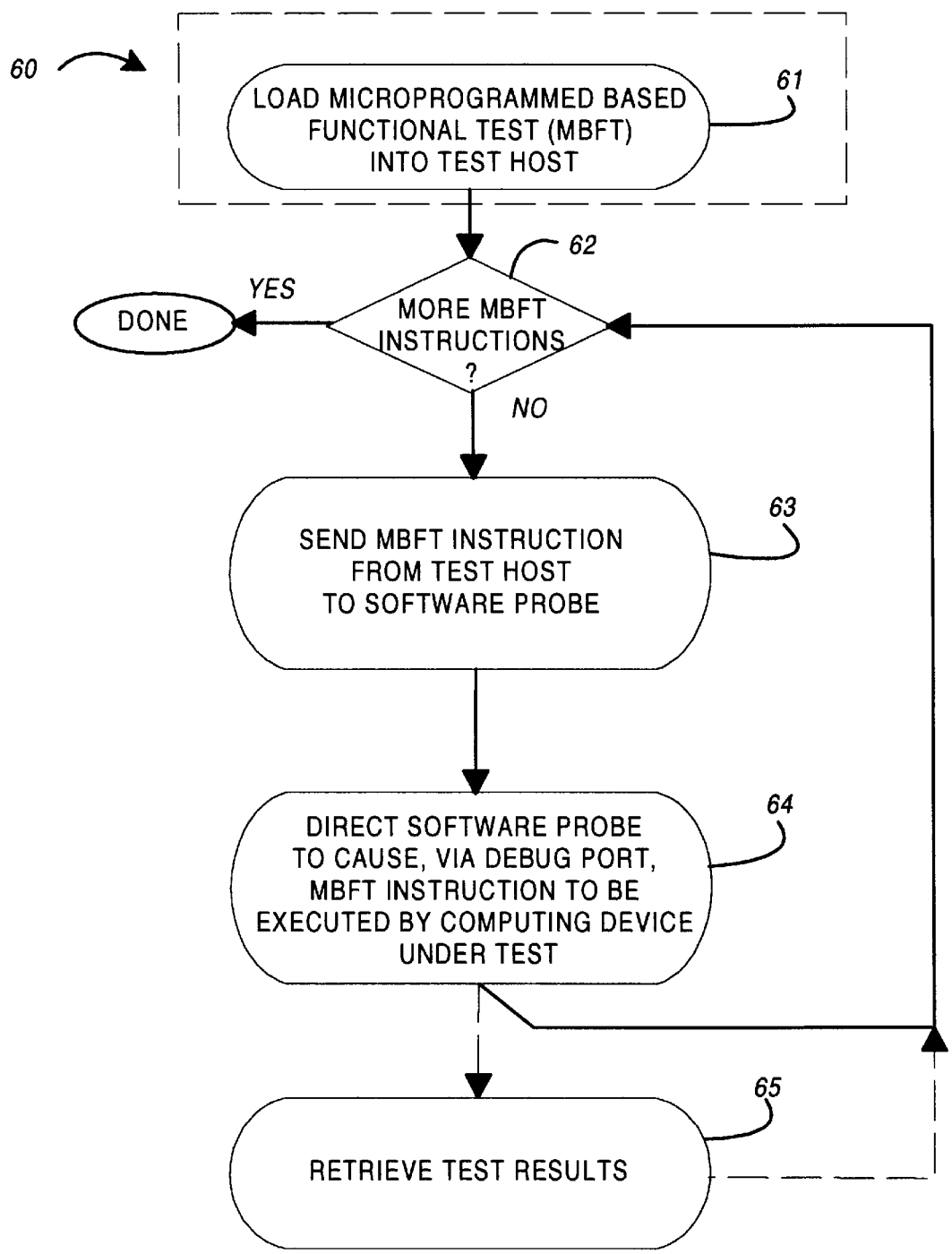
FIG. 6 is a flowchart depicting the method of the present invention executed in interactive mode in the context of the wafer level computing device test system of FIG. 4.

FIG. 6 is a flowchart depicting the method of the present invention executed in interactive mode in the context of the wafer level computing device test system 40 of FIG. 4. As shown in FIG. 6, the method for testing the computing device under test 47 includes an optional first step 61 of loading a microprogram based functional test onto the test host. The microprogram based functional test may be developed by a user, automatically generated, or derived from a ROM-based microprogram based functional test. If step 61 is not performed, an operator may enter microprogram based functional test instructions from a keyboard to the test host 42. In a step 62, the computing system probe 43 determines if more microprogram based functional test instructions are to be executed. If so, the next microprogram based functional test instruction is sent from the test host 42 to the computing system probe 43 in a step 63. In a step 64, the microprogram based functional test instruction is sent from the computing system probe 43 to the computing device under test 47 via its emulation debug port 48 and executed. Results may then optionally be retrieved in a step 65. Steps 62–64 are repeated until no more microprogram based functional test instructions are to be executed. Results are retrieved using either the computing system probe 43 in conjunction with the debug port 48 of the computing device under test 47, or through another type of I/O device or through observance of a register. The results may be analyzed using debugging and performance analysis tools resident on the test host 42.

Figure 7:
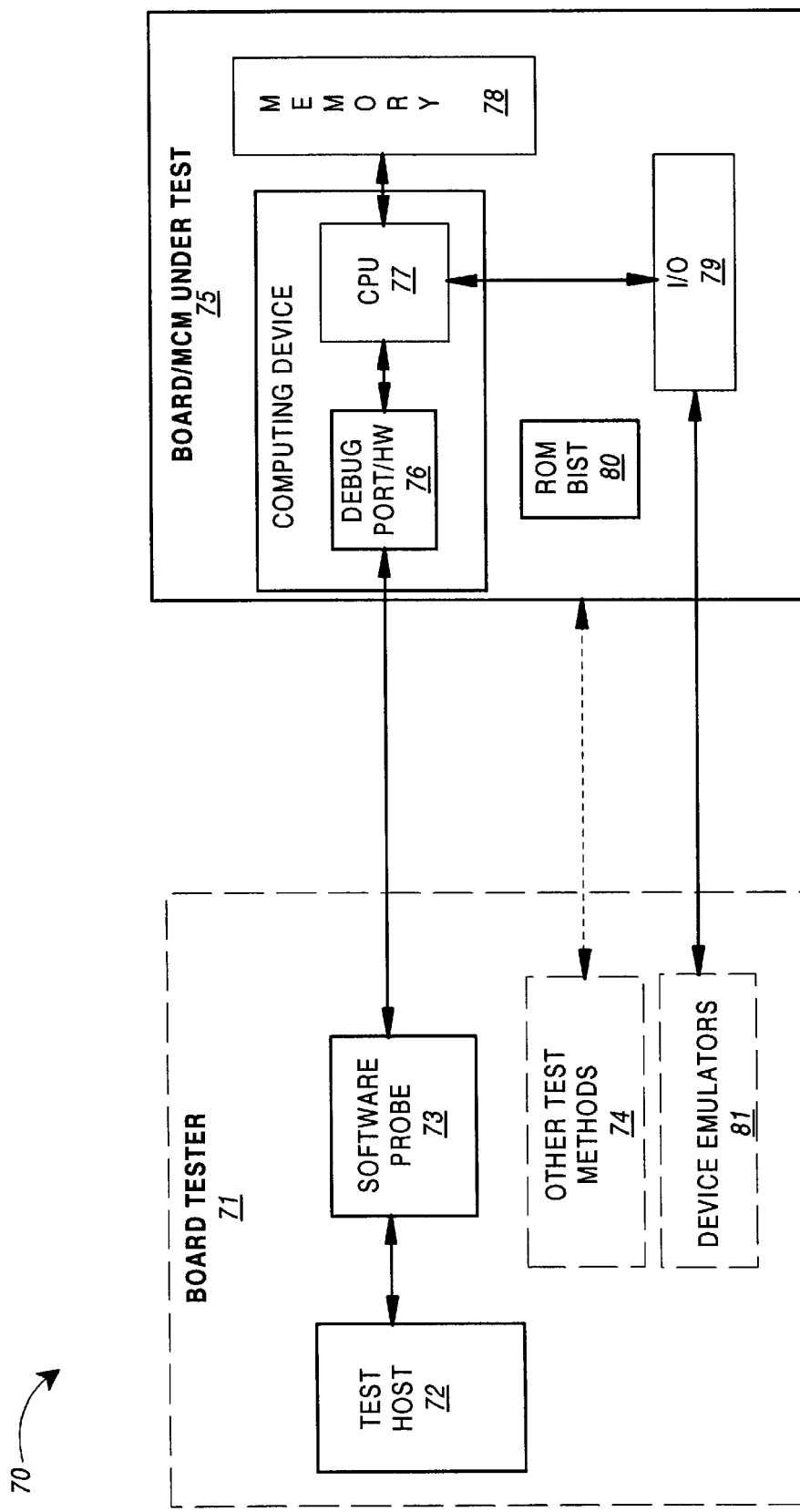
FIG. 7 is a block diagram of a system in accordance with the present invention for executing a microprogram based functional test on a computing device at the board/MCM testing level.

FIG. 7 is a block diagram of a system 70 in accordance with the present invention for executing a microprogram based functional test on a computing device at the board/MCM testing level. The system 70 comprises a board tester 71 and a board/MCM under test 65, which includes a computing device with an emulation debug port and associated hardware 76. At the board/MCM level, what is tested is the board/MCM under test 75 which incorporates a computing device that has emulation debug hardware and an emulation debug port 76. Generally, the board/MCM under test 75 includes memory 78 and I/O devices 79, and therefore the board tester 71 need not emulate memory or I/O devices. If the board/MCM under test 75 is to become part of a larger system, however, the board tester 71 may have to include other device emulators 81. As shown in FIG. 7, the board tester 71 includes a test host 72 and computing system probe 73 such as those used in the embodiment of FIG. 3, and may also include other device emulators 81. If the board/MCM under test 75 includes a memory 78, a microprogram based functional test may be downloaded from the test host 72 via the computing system probe 73 through the debug port 76 into the memory 78 and executed directly from the there. The board tester 71 may include other test methods 74 such as boundary scan, in-circuit test, vectorless test, functional test and other tests to complete a test suite.

Figure 8:
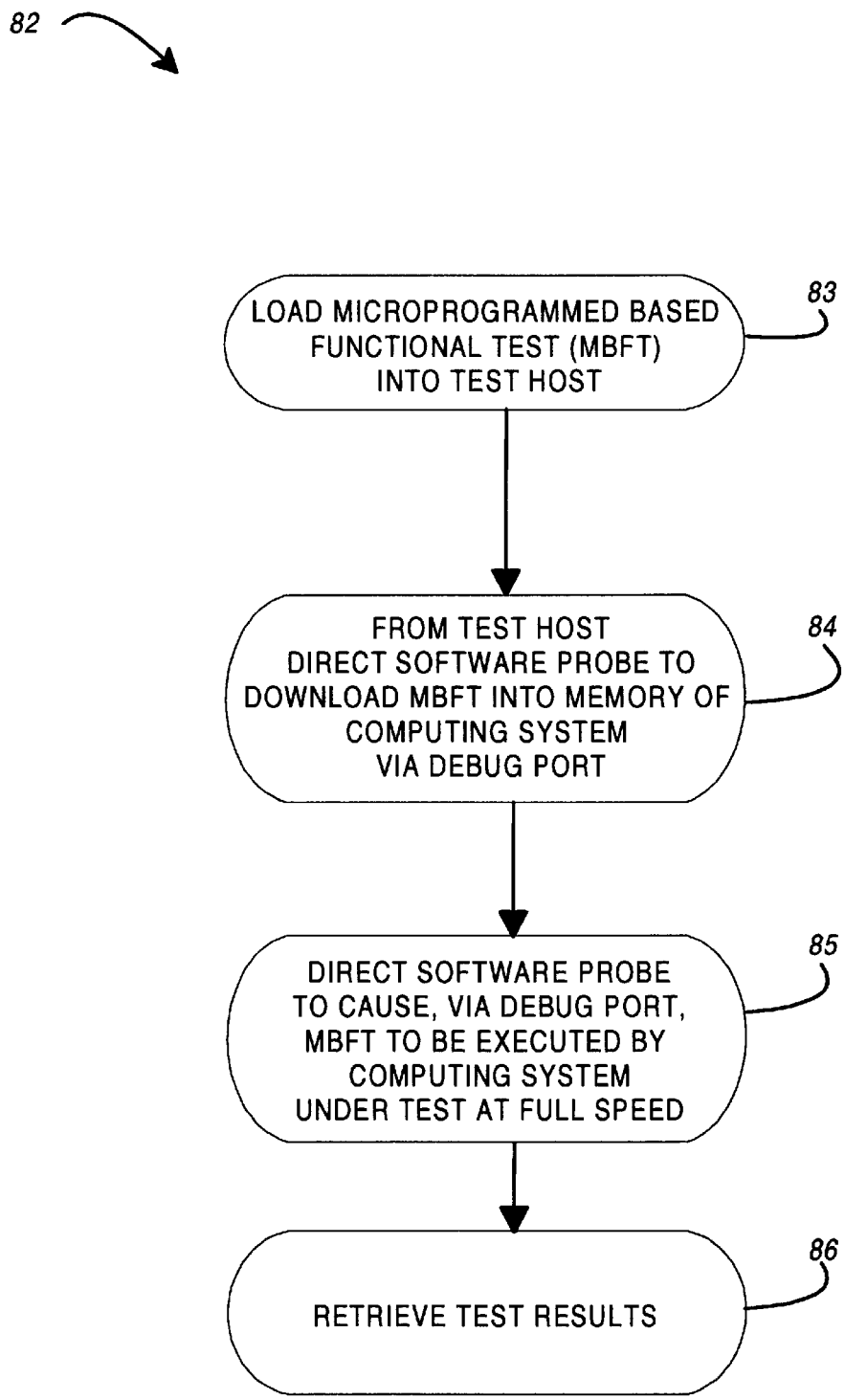
FIG. 8 is a flowchart depicting the method of the present invention in the context of the board/MCM level computing device test system of FIG. 7.

FIG. 8 is a flowchart depicting the batch mode method of the present invention in the context of the board/MCM level computing device test system 70 of FIG. 7, with the assumption that the board/MCM under test 75 includes a memory 78 and the microprogram based functional test will be downloaded into and executed from the memory 78. As shown in FIG. 8, the method 82 for testing the board/MCM under test requires a first step 83 of loading the microprogram based functional test onto the-test host. The microprogram based functional test may be developed by a user, automatically generated, or derived from a ROM-based microprogram based functional test. In a step 84, the microprogram based functional test is then sent to the computing system probe 73 and downloaded into the memory 78 of the board/MCM under test 75 via a download command sent to the emulation debug port 76. In a step 85, an operator or a test script executing on the test host 72 directs the computing system probe 73 to commence execution of the microprogram based functional test directly from the board/MCM memory 78 via an execute command sent to the debug port 76 on the board/MCM under test 75. When the microprogram based functional test is complete, results of the microprogram based functional test are retrieved in a step 86 either via the debug port 76, through observing registers, or through any type of I/O device. The results may then be analyzed using debugging and performance analysis tools. Also, depending on what the test results are, a test script can be designed to loop on a test, branch to run a different test based on what happened, or go into interactive mode.

As will be appreciated by one skilled in the art, this invention may be distinguished from the prior art in several ways. First, the system and method of the invention operates to apply microprogram based functional tests via a computing system probe to a computing device under test using its emulation debug port. The emulation debug port and associated emulation debug hardware in this invention are being utilized as part of a manufacturing test instrument, which is not its intended function. Rather than being used to develop and debug system firmware around the computing device, the emulation debug hardware is instead used to control the execution of a manufacturing microprogram based functional test. In addition, the invention applies the methodology of machine level code selftest at all levels of circuit integration, including the wafer and packaged levels, which has not heretofore been done. Application of microprogram based functional tests is virtually impossible at the wafer level of integration unless the methodology of the present invention is used.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method for testing a computing system under test, said computing system comprising a computing device, said computing device comprising internal emulation debug hardware and an emulation debug port through which said internal emulation debug hardware is controlled, said method comprising the steps of:

(a) providing a manufacturing level microprogram based functional test to a computing system probe which communicates with said computing device via said emulation debug port; and (b) causing said computing system probe to communicate with said computing device via said emulation debug port to control execution of said manufacturing level microprogram based functional test by said internal emulation debug hardware;

wherein said manufacturing level microprogram based functional test may be executed at each level of computing device integration testing including wafer level, package level, board level, multi-chip module level and system level.

2. The method of claim 1, wherein said microprogram based functional test is sent to said computing system probe from a test host computer.

3. The method of claim 1, wherein said microprogram based functional test is executed one microprogram based functional test instruction at a time by sending said one instruction at a time to said computing system probe and said computing system probe causing, via said emulation debug port, said one instruction at a time to be executed by said computing device.

4. The method of claim 1, wherein said microprogram based functional test is downloaded into memory of said computing device via an emulation debug download command and said microprogram based functional test is executed from said memory upon receipt of an emulation debug execute-from-memory command.

5. The method of claim 1, further comprising the step of:
(c) retrieving microprogram based functional test results.

6. The method of claim 5, wherein said microprogram based functional test results are retrieved from the computing device via said emulation debug port.

7. The method of claim 5, wherein said microprogram based functional test results are retrieved via an I/O device.

8. The method of claim 5, wherein said microprogram based functional test results are retrieved by examining contents of a register internal to said computing system.

9. The method of claim 5, further comprising the step of:
(d) analyzing said microprogram based functional test results using debugging and performance analysis tools.

10. The method of claim 5, further comprising the step of:
(e) branching to run a different test if said microprogram based functional test results indicate such a branch condition.

11. The method of claim 5, further comprising the step of:
(f) branching to run a different microprogram based functional test in interactive mode if said microprogram based functional test results indicate such a branch condition.

12. The method of claim 5, further comprising the step of:
(g) modifying said microprogram based functional test to produce a modified microprogram based functional test.

13. The method of claim 12, wherein steps (a) through (c) are repeated using said modified microprogram based functional test as said microprogram based functional test.

14. The method of claim 1, wherein said microprogram based functional test is derived through modification, addition to, or removal from, code developed for a ROM-based built-in selftest.

15. A manufacturing test system for testing a computing system under test, said computing system comprising a computing device, said computing device comprising internal emulation debug hardware and an emulation debug port through which said internal emulation debug hardware is controlled, said manufacturing test system comprising:

a computing system probe which receives a manufacturing level microprogram based functional test and which communicates with said computing device via said emulation debug port to control execution of said manufacturing level microprogram based functional test by said internal emulation debug hardware;

wherein said manufacturing level microprogram based functional test may be executed at each level of computing device integration testing including wafer level, package level, board level, multi-chip module level and system level.

16. The manufacturing test system of claim 15, further comprising a test host computer wherein said microprogram based functional test is sent to said computing system probe from said test host computer.

17. The manufacturing test system of claim 15, wherein said microprogram based functional test is executed one microprogram based functional test instruction at a time by sending said one instruction at a time to said computing system probe and said computing system probe causing, via said emulation debug port, said one instruction at a time to be executed by said computing device.

18. The manufacturing test system of claim 15, wherein said computing device comprises a memory, and wherein said computing system probe executes said microprogram based functional test by downloading said microprogram based functional test into said memory via an emulation debug download command and causes said microprogram based functional test to be executed from said memory.

19. The manufacturing test system of claim 15, wherein said microprogram based functional test is derived through modification, addition to, or removal from, code developed for a ROM-based built-in selftest developed for said computing device.

20. The manufacturing test system of claim 15, wherein test results from execution of said microprogram based functional test are retrieved.

21. The manufacturing test system of claim 20, wherein said test results are retrieved from the computing device via said emulation debug port.

22. The manufacturing test system of claim 20, wherein said test results are retrieved via an I/O device.

23. The manufacturing test system of claim 20, wherein said test results are retrieved by examining contents of a register internal to said computing system.

24. The manufacturing test system of claim 20, further comprising debugging and performance analysis tools for analyzing said test results.

25. The manufacturing test system of claim 20, wherein said microprogram based functional test may be modified based on said test results to produce a modified microprogram based functional test.

26. The manufacturing test system of claim 25, wherein said modified microprogram based functional test is used as said microprogram based functional test.

* * * * *